Patented Nov. 30, 1948

2,454,921

UNITED STATES PATENT OFFICE 2,454,921

PRODUCTION OF ALUMINUM FLUORIDE GELS

Heinz Heinemann, Upper Darby, Pa., assignor to Porocel Corporation, Philadelphia, Pa., a corporation of Delaware No Drawing. Application February 28, 1946, Serial No. 651,047

4 Claims. (Cl. 23—88)

The present invention relates to the production of solid aluminum fluoride gels of high porosity and surface area, which gels are suitable for converting or refining hydrocarbon oils, and for bleaching animal and vegetable oils and fats.

In accordance with the present invention, solid aluminum fluoride gels are obtained by treating alumina, preferably in hydrated form, such as bauxite or activated alumina, with hydrofluoric acid under specific conditions, and thereafter drying and activating the gel at an elevated temperature.

More particularly, the alumina-containing material is treated with an amount of aqueous hydrofluoric acid sufficient to convert all of the alumina to aluminum fluoride, the concentration of the hydrofluoric acid being maintained within the range of 30% to 40%. Concentrations of acid below about 30% give solutions of aluminum fluoride but no gel, whereas concentrations above about 40% result in the production of hard, stony products totally dissimilar to gels and having none of the properties thereof. In converting activated alumina, a theoretically equivalent amount of 30%–40% hydrofluoric acid is used, based upon the alumina content of the starting material. However, in the case of bauxite, an amount of 30%–40% hydrofluoric acid is used such as to combine with all of the alumina and silica contained in the bauxite. In either case, however, a slight excess of acid over that calculated to be necessary may be utilized without detriment. The reaction between the alumina and the acid is usually violent and exothermic, and for all practical purposes may be initiated at ordinary temperatures (60° F. to 80° F.), since no beneficial effect has been observed upon heating the reactant mixture. When using bauxite as the starting material, silicon tetrafluoride is expelled in large quantities, and gel formation commences after the reactant mixture has been permitted to remain quiescent for several hours. Gelation is usually complete in 10 to 20 hours. The gel, which may contain about 60% by weight of water, partially as combined water and partially as free water, may then be dried by mild heating or by subjecting to a reduced pressure in the presence of a desiccant at ordinary temperature. If drying is effected by the latter method, the removal of any free hydrofluoric acid may later be accomplished by mild heating. The resulting product is a hydrated aluminum fluoride which may or may not contain traces of titanium compounds as impurities, such fluoride having a gel structure similar to that of silica gel. The dried gel may be activated by controlled heating at temperatures between 100° C. and 400° C. Dehydration of the original gel by means of a desiccant at ordinary temperatures removes substantially all free moisture and leaves a solid gel having a combined water content of about 43% by weight. Activation of the dried gel by heating at 100° C. leaves a residual combined water content of about 24%; at 150° C. to 170° C. about 17%; and at 250° C. to 400° C. about 10%. Prolonged heating of the gel at temperatures between 400° C. and 500° C. will result in a further reduction in water content to a value between 2% and 5% by weight. Since the activation by dehydration is a function of temperature and is influenced to some extent by the length of the heating period, it is necessary to control the activation with respect to both temperature and time in order to arrive at the desired water content, which will be governed by the use to which the gel product is to be put. In any case the heat treatment should not be carried out at such temperature or for such period of time as to completely dehydrate the product, which would then lose its gel characteristics of high porosity and surface area, and become inert. The gel, after drying, and before or after thermal activation, may be crushed and screened to the desired particle size.

The present invention may be further illustrated by the following example, which, however, is not to be construed as limiting the scope thereof.

Bauxite ore, having a total volatile matter content (water) of 30% by weight was analyzed and found to contain, upon a volatile-free or dry basis, 84.89% $Al_2O_3$, 10.22% $SiO_2$, 2.96% $TiO_2$, and 1.93% $Fe_2O_3$. To 100 parts by weight of the bauxite containing 30% of water was added 153 parts by weight of 52% aqueous hydrofluoric acid and 34 parts by weight of water. The amount of acid was calculated as sufficient to react with all of the $Al_2O_3$ and $SiO_2$ contained in the bauxite, and the amount of water contained in the 52% acid, plus the water naturally contained in the bauxite, plus the added water was sufficient to give an effective concentration of hydrofluoric acid of 35%. The reaction between the bauxite and the acid was vigorous, with the generation of considerable heat, and the evolution of considerable quantities of silicon tetrafluoride. The reaction mixture was permitted to remain quiescent for 24 hours, the aluminum fluoride gel beginning to form about 10 hours after the initiation of the reaction, and the gel formation being complete in 24 hours. The gel was a paste containing about 60% of water, and this paste was dried in a vacuum desiccator for 3 days, whereby there was obtained a mass of hard, translucent fragments having a combined water content of about 43% by weight. The dried gel was then thermally activated by heating at 370° C. for 2 hours, the combined water content of the activated gel being 9.4% by weight. The gel, after crushing and screening to 8–30 mesh, was found to have a bulk density of 0.5 gram per cc., and a surface area of 122 square meters per gram.

While, in the above preparation, raw bauxite ore was used as the starting material, it is also possible to use either partially or totally dehydrated bauxite or activated alumina in lieu of raw bauxite.

I claim:

1. A method for producing an aluminum fluoride gel, which comprises digesting alumina with at least a chemically equivalent amount of aqueous hydrofluoric acid, the quantity of water in the reactant mixture being such as to give hydrofluoric acid of a concentration between 30% and 40%, and drying the resulting gel.

2. A method for producing an aluminum fluoride gel, which comprises digesting alumina with at least a chemically equivalent amount of aqueous hydrofluoric acid, the quantity of water in the reactant mixture being such as to give hydrofluoric acid of a concentration between 30% and 40%, drying the resulting gel, and activating the gel by heating at a temperature below 400° C.

3. A method for producing an aluminum fluoride gel, which comprises digesting bauxite with aqueous hydrofluoric acid equivalent to 30% to 40% concentration and in an amount sufficient to react with the entire alumina and silica content of the bauxite, and drying the resulting gel.

4. A method for producing an aluminum fluoride gel, which comprises digesting bauxite with aqueous hydrofluoric acid equivalent to 30% to 40% concentration and in an amount sufficient to react with the entire alumina and silica content of the bauxite, drying the resulting gel, and activating the gel by heating at a temperature between 100° C. and 400° C.

HEINZ HEINEMANN.

REFERENCES CITED

The following references are of record in the file of this patent:

Mellor: Inorganic and Theoretical Chemistry, vol. 5, pp. 300 and 302. Published by Longmans, Green, and Co., London (1924).